United States Patent
Ponnamaneni et al.

(10) Patent No.: US 11,822,472 B2
(45) Date of Patent: Nov. 21, 2023

(54) MEMORY MANAGEMENT UNIT FOR MULTI-THREADED ARCHITECTURE

(71) Applicant: Ceremorphic, Inc., San Jose, CA (US)

(72) Inventors: Radhika Ponnamaneni, Karimnagar (IN); Kalash Bhavin Shah, Maharashtra (IN); Somya Dashora, Rajasthan (IN)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 17/575,521

(22) Filed: Jan. 13, 2022

(65) Prior Publication Data

US 2023/0222059 A1 Jul. 13, 2023

(51) Int. Cl.
*G06F 12/08* (2016.01)
*G06F 12/0802* (2016.01)
*G06F 3/06* (2006.01)
*G06F 12/1027* (2016.01)

(52) U.S. Cl.
CPC ........ *G06F 12/0802* (2013.01); *G06F 3/0604* (2013.01); *G06F 3/0665* (2013.01); *G06F 3/0679* (2013.01); *G06F 12/1027* (2013.01); *G06F 2212/60* (2013.01); *G06F 2212/68* (2013.01)

(58) Field of Classification Search
CPC .. G06F 12/0802; G06F 3/0604; G06F 3/0665; G06F 3/0679; G06F 2212/60; G06F 2212/68; G06F 12/1027

USPC .......................................................... 711/118
See application file for complete search history.

(56) References Cited

U.S. PATENT DOCUMENTS

2011/0247000 A1* 10/2011 Eidus ........................ G06F 9/50
718/107
2020/0257635 A1* 8/2020 Park .................... G06F 12/1036

* cited by examiner

*Primary Examiner* — Hua J Song
(74) *Attorney, Agent, or Firm* — File-EE-Patents.com; Jay A. Chesavage

(57) ABSTRACT

An exemplary multi-threaded memory management system comprises a memory management unit (MMU) configured with a plurality of physical address (PA) output ports individually dedicated to a respective plurality of threads, wherein the MMU is configured to adjust scheduling of the plurality of threads based on the status of an item requested from a cache. The MMU may be configured to translate a virtual address (VA) input from an individual thread to a PA output on the respective PA output port. The cache may be a translation look-aside buffer. The item requested from the cache may be in transient status when a response is expected or valid status when the response is received. The MMU may signal a thread scheduler to run a thread when a requested item's status becomes valid, permitting stalling individual threads without blocking other threads that continue running using the PA output port dedicated to each thread.

20 Claims, 4 Drawing Sheets

MEMORY MANAGEMENT UNIT FOR MULTI-THREADED ARCHITECTURE

CROSS-REFERENCE TO RELATED APPLICATIONS

None.

TECHNICAL FIELD

This disclosure relates generally to computer memory management.

BACKGROUND

Computer memory management is active allocation of memory resources. Some computers have multiple types of memory with different characteristics. For example, a cache memory may be fast to access but limited in capacity. Main memory may be more plentiful than a cache but limited in access speed. Stable storage such as disk may be relatively slow but effectively unlimited in capacity. A computer memory management system may employ a memory management unit (MMU) designed to dynamically allocate data across various memory types for efficient access as the computer system operates.

Some MMUs include a cache configured as a translation look-aside buffer (TLB). A TLB may be configured to retrievably store virtual address (VA), physical address (PA) pairs (VA-PA pairs) used by the MMU to translate a VA provided by an executing program to a PA for use by the program to access system resources such as memory. Some MMUs may be configured to manage memory for multiple threads. In an illustrative example, each thread may execute using a VA known to the program, and the VA may be translated into a PA by the MMU using the TLB.

In an illustrative example, the TLB may be a common resource shared among multiple threads executing different programs on a computer system. Each request to the MMU to translate a VA to a PA may result in a TLB hit with the VA-PA pair being found in a first level of the TLB, or if the VA-PA pair is not found, a miss may result. In the case of a miss, the TLB may send the request to a lower level, requiring significant additional time to locate and return the VA-PA pair to the requesting thread. If the requested VA-PA pair is not found in the TLB lower level, the request may be passed to a page table walk (PTW) unit, requiring even more time to locate the requested item in main memory. When a requested item is not found in the TLB, one or more other thread requesting an item that is in the TLB may stall execution waiting for the thread that requested the item not initially found in the TLB.

SUMMARY

An exemplary multi-threaded memory management system comprises a memory management unit (MMU) configured with a plurality of physical address (PA) output ports individually dedicated to a respective plurality of threads, wherein the MMU is configured to adjust scheduling of the plurality of threads based on the status of an item requested from a cache. The MMU may be configured to translate a virtual address (VA) input from an individual thread to a PA output on the respective PA output port. The cache may be a translation look-aside buffer. The item requested from the cache may be in transient status when a response is expected or valid status when the response is received. The MMU may signal a thread scheduler to run a thread when a requested item's status becomes valid, permitting stalling individual threads without blocking other threads that continue running using the PA output port dedicated to each thread.

An example implementation in accordance with the present disclosure may comprise a multi-threaded memory management unit configured with a TLB designed to translate virtual address (VA) inputs to physical address (PA) outputs based on a thread Id in each TLB entry. The TLB may be configured with a separate PA output port/register dedicated to each individual thread, permitting all threads to execute independently of cross-thread dependency/resource blocking involving the TLB PA output.

In another example implementation in accordance with the present disclosure the MMU is configured to adjust scheduling of the plurality of threads based on the status of an item requested from the TLB. The item may be the VA-PA pair required for a requesting thread to make progress. The requested item and the corresponding PA output port/register status may be marked as transient if a response is expected, or valid when the response has been received, permitting a thread scheduler to allow threads not waiting for a response to continue execution or TLB lookup and provide the corresponding PA to their respective output port/register. When the response for that request arrives, the transient bit is unset, and normal pipelined handshake operation continues.

In another example implementation in accordance with the present disclosure each separate PA output port/register dedicated to an individual thread is configured with a per-thread transient bit and per-thread valid bit corresponding to the status of the item requested by the individual thread, permitting coordination of the individual PA outputs as responses arrive.

In another example implementation in accordance with the present disclosure separate PA output ports/registers may be configured to capture multiple simultaneous responses from different sources/levels in a single clock cycle without stalls, providing fair non-blocking access to PA outputs for each thread.

Various implementations may achieve one or more technical effect. For example, some implementations improve processor utilization by multiple threads. Such improved processor utilization may be a result of reducing or eliminating competition among threads for a shared TLB based on a non-blocking multi-threaded TLB access design using a separate dedicated output port for each thread. For example, while a VA-PA translation for an individual thread may require thousands of clock cycles, the other independent threads will be able to move forward during this time using their dedicated per-thread PA output ports to access memory, as designs in accordance with the present disclosure remove inter-thread dependency on the TLB. Even on a long lookup for one thread, other threads may continue their execution independently from the outputs of the other threads without starvation, as a result of a non-blocking multi-threaded TLB access design using a separate dedicated output port for each thread.

Some implementations may improve multi-threading efficiency in scenarios where multiple responses are occurring simultaneously. Such improved multi-threading efficiency may be a result of a non-blocking multi-threaded TLB access design using a separate dedicated output port for each thread permitting each thread to continue execution with no inter-thread dependency when multiple responses for multiple threads are occurring simultaneously from different sources with different lookup times. For example, one thread may be waiting for a response from a page table walk (PTW) unit (longest response time), another thread may be waiting for a response from a Main-TLB (less response time), while another thread may receive a response as a result of a TLB hit (shortest response time). In such a case of multiple responses with different expected response times, an implementation of a non-blocking multi-threaded TLB access design using a separate dedicated output port for each thread may permit other threads to continue execution without the need for the added cost and complexity of priority logic to resolve dependencies between simultaneous outputs from multiple sources. A design in accordance with the present disclosure's teachings may push synchronization downstream from the TLB, thereby permitting multiple threads to independently access system resources using their dedicated per-thread PA output port.

In some implementations, indirect stalls for all the threads may be avoided. This facilitation may be a result of a dedicated per-thread PA output port permitting each thread to find an empty or available port to store a valid response, avoiding a situation wherein other threads could not access this port due to the output port/register having to hold the valid output until the pipeline accepts the MMU response and causing an indirect stall for all the threads, which is avoided by designs using separate per-thread PA output ports in accordance with the present disclosure.

In an aspect, an apparatus may comprise: a memory management unit (MMU) configured with a plurality of physical address (PA) output ports individually dedicated to a respective plurality of threads, wherein the MMU is configured to adjust scheduling of the plurality of threads based on a status of an item requested from a cache.

The MMU may be configured to translate a virtual address (VA) input from an individual thread to a PA output on the respective PA output port.

The cache may further comprise a translation look-aside buffer (TLB).

The item requested may further comprise an instruction.

The item requested may further comprise data.

The status of the item requested from the cache may further comprise expecting a response comprising the item requested from the cache.

The status of the item requested from the cache may further comprise receiving a response comprising the item requested from the cache.

Adjust scheduling may further comprise signal a thread scheduler.

Adjust scheduling of the plurality of threads based on the status of the item requested from the cache may further comprise: in response to determining at least one thread will stall waiting for an expected response comprising the item requested from the cache, signal the thread scheduler to permit the at least one thread to not run; and in response to receiving the response comprising the item requested from the cache for the at least one thread, signal the thread scheduler to permit the at least one thread to run.

In another aspect, an apparatus may comprise: a memory management unit (MMU) configured with a plurality of physical address (PA) output ports, wherein each PA output port of the plurality of PA output ports is individually dedicated to one respective thread of a plurality of threads, and wherein each respective thread of the plurality of threads executes processor executable instructions fetched from a virtual address (VA) determined by a per-thread Program Counter (PC) dedicated to the respective thread; a thread scheduler operably coupled with the MMU, wherein the thread scheduler is configured to govern execution scheduling of the plurality of threads based at least in part on round-robin scheduling, wherein the MMU is configured to adjust scheduling of the plurality of threads at least in part by signaling the thread scheduler to run or not run one or more thread of the plurality of threads based on a status of an item requested by the one or more thread from a multi-level translation look-aside buffer (TLB), and wherein the status of the item requested from the multi-level TLB by the one or more thread is one of transient status, valid status, or invalid status; and a multiplexer configured to govern the plurality of PA output ports, wherein the PA output port dedicated to each thread not having an invalid or transient status for the requested item is enabled.

The multi-level TLB may be operably coupled with a page table walk (PTW) unit configured to locate the item requested in response to receiving request for the item as a result of a miss in at least one level of the multi-level TLB, and wherein the multi-level TLB is operably coupled with the plurality of PA output ports to provide at least one response comprising the requested item.

The MMU may further comprise the multi-level TLB configured to retrievably store a plurality of TLB entries wherein each TLB entry of the plurality of TLB entries comprises a Virtual Address, Physical Address (VA-PA) pair, wherein the plurality of VA-PA pairs are indexed per thread in the multi-level TLB by a unique thread Id.

The MMU may be configured to use the thread Id associated with one or more thread to locate the TLB entry storing a VA-PA pair associated with the item requested by the one or more thread from the multi-level TLB.

Each PA output port of the plurality of PA output ports may be configured with a transient bit operably coupled with logic designed to determine a digital value of the transient bit based on the status of the item requested from the multi-level TLB by the one or more thread.

Each PA output port of the plurality of PA output ports may be configured with a valid bit operably coupled with logic designed to determine a digital value of the valid bit based on the status of the item requested from the multi-level TLB by the one or more thread.

The apparatus may further comprise logic configured to signal the thread scheduler to permit the at least one thread to run or not run based on a digital value of a transient bit or a valid bit configured in the PA output port dedicated to the at least one thread.

In another aspect, an apparatus may comprise: a memory management unit (MMU) configured with a plurality of physical address (PA) output ports, wherein each PA output port of the plurality of PA output ports is individually dedicated to one respective thread of a plurality of threads, and wherein each respective thread of the plurality of threads executes processor executable instructions fetched from a virtual address (VA) determined by a per-thread Program Counter (PC) dedicated to the respective thread; a thread scheduler operably coupled with the MMU, wherein the thread scheduler is configured to govern execution scheduling of the plurality of threads based at least in part on round-robin scheduling, wherein the MMU is configured to adjust scheduling of the plurality of threads at least in part by signaling the thread scheduler to run or not run one or more thread of the plurality of threads based on a status of an item requested by the one or more thread from a multi-level translation look-aside buffer (TLB), wherein the status of the item requested from the multi-level TLB by the one or more thread is one of transient status, valid status, or invalid status, wherein the multi-level TLB is operably coupled with a page table walk (PTW) unit configured to locate the item requested in response to receiving a request for the item as a result of a miss in at least one level of the multi-level TLB, and wherein the multi-level TLB and the PTW unit are operably coupled with the plurality of PA output ports to provide a plurality of responses simultaneous within a predetermined time period, wherein the plurality of responses comprise a respective plurality of requested items, wherein each requested item was requested by an individual thread of the plurality of threads, and wherein each response of the plurality of responses is output to the PA output port dedicated to the individual thread; and a multiplexer adapted with a number of inputs corresponding to the number of the plurality of threads, wherein the multiplexer is configured to govern the plurality of PA output ports, and wherein the PA output port dedicated to each thread not having an invalid or transient status for any requested item is enabled.

The apparatus may further comprise a pipelined processor operably coupled with the MMU.

The pipelined processor may further comprise a superscalar processor.

The pipelined processor may further comprise a plurality of fetch stages, wherein the status of the item requested from the multi-level TLB by the one or more thread may be determined as a function of an item status output from at least two fetch stages of the plurality of fetch stages.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
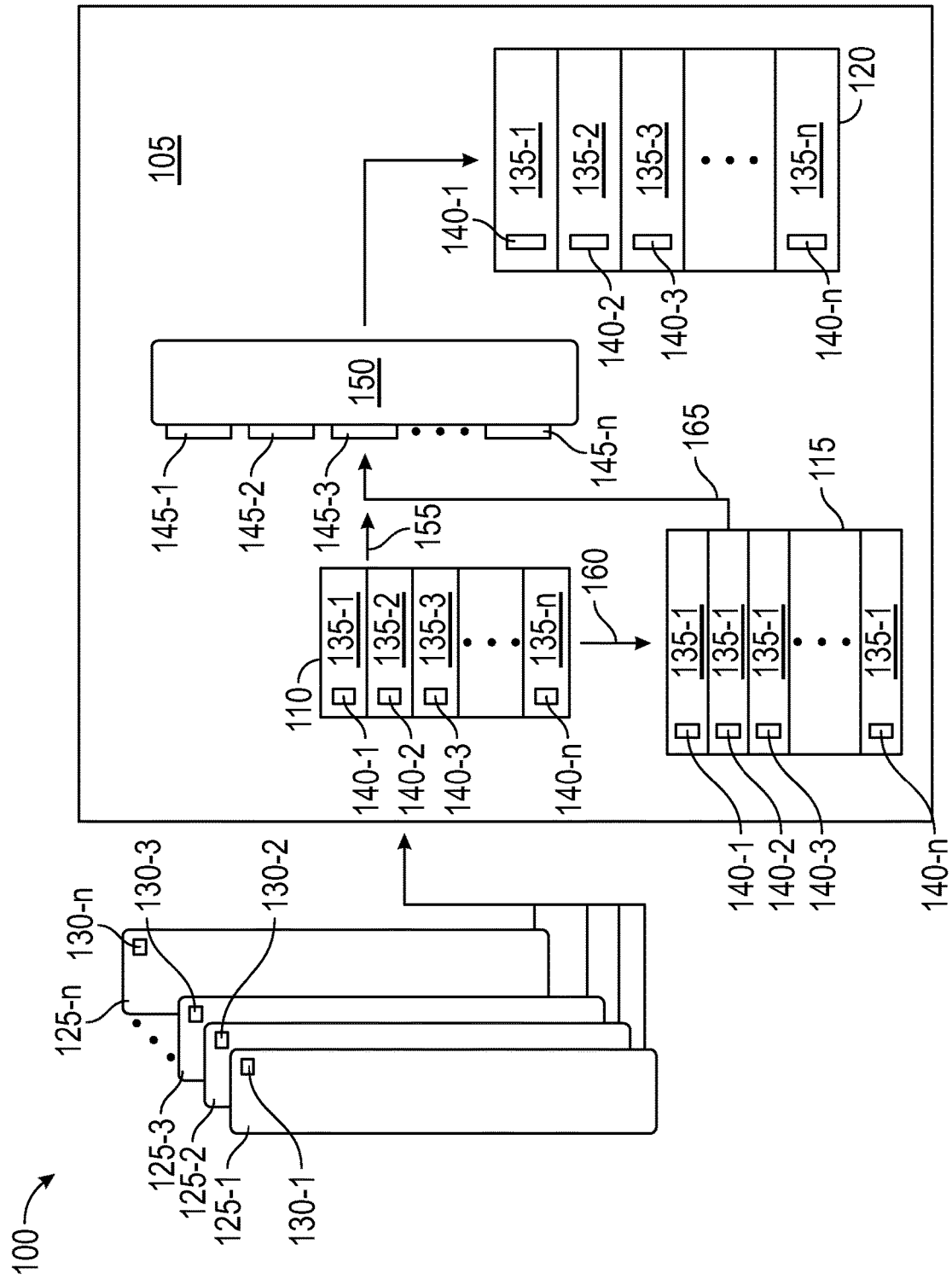
FIG. 1 is a block diagram of an exemplary multi-threaded memory management system having a memory management unit (MMU) configured with a plurality of physical address (PA) output ports individually dedicated to a respective plurality of threads, wherein the MMU is configured to adjust scheduling of the plurality of threads based on a status of an item requested from a cache.

To aid understanding, this document is organized as follows. First, a hierarchical general description distinct from the description of the drawings is presented. Second, non-blocking multi-threaded memory management system design using dedicated physical address (PA) output ports for each thread from a multi-threaded TLB, and scheduling threads based on the status of items requested from the TLB, is briefly introduced with reference to FIG. 1. Third, with reference to FIGS. 2-3, the discussion turns to exemplary implementations that illustrate non-blocking multi-threaded memory management system design. Specifically, per-thread dedicated PA output port and pipeline transient and valid bit handshake implementations are presented. Then, with reference to FIGS. 4-5, an illustrative scenario of an exemplary multi-threaded memory management system implementation handling multiple simultaneous TLB requests and responses with per-thread transient and valid bit pipeline handshakes are disclosed to present improvements in multi-threaded memory management technology.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features. In particular, it is noted that the respective implementation features, even those disclosed solely in combination with other implementation features, may be combined in any configuration excepting those readily apparent to the person skilled in the art as nonsensical.

The present disclosure teaches computer memory management. Computer memory management may be implemented as a method of using hardware components in accordance with the present disclosure. Computer memory management may be implemented as an apparatus in accordance with the present disclosure. The apparatus may be a memory management system. The memory management system may comprise a multi-threaded memory management system. The memory management system may comprise a memory management unit (MMU). The MMU may comprise a multi-threaded MMU. The MMU may comprise a cache. The cache may be a multi-level cache. The cache may be a translation look-aside buffer (TLB). The TLB may be a multi-level TLB. The TLB may be configured to receive a request for a cached item. The item may be a physical address (PA) corresponding to a virtual address (VA) presented with a request to the TLB. The TLB may return a response comprising the requested item and an indication of a hit if the requested item is found in the TLB. If the requested item is not found in the TLB, the TLB may return a response comprising an indication of a miss. If the requested item is not found in the TLB, the TLB may forward the request to another TLB or to another level of a multi-level TLB. If the requested item is not found, the TLB may forward the request to a Page Table Walk (PTW) unit. The PTW unit may be configured to search for the requested item in main memory or another cache. The PTW unit may return a response comprising the requested item if the item is found. The PTW unit may return a response comprising a page fault if the item is not found or the permission checks do not succeed.

The TLB may be configured to store virtual address (VA) to physical address (PA) mappings for an entire system. In an illustrative example, a VA to PA mapping may be stored by the TLB as a Virtual Address, Physical Address (VA-PA) pair. The VA stored by the TLB may comprise a virtual page number (VPN). The PA stored by the TLB may comprise a physical page number (PPN). The Each VA-PA pair stored by the TLB may be encoded by a TLB entry. The TLB is configured to retrievably store a plurality of TLB entries. Each TLB entry comprises a plurality of fields such as, for example, the VA-PA pair, permission bits, and a thread Id uniquely identifying the thread associated with the TLB entry. A request to the TLB comprises a plurality of fields such as, for example, a thread Id and a VA. The request to the TLB may further comprise an identification of the address space for the request. The request comprising the address space identification permits the TLB to provide access to the same VA to PA translations in different address spaces. In some implementations, a request that does not match all fields of the TLB entry will be declared a miss in the TLB. In an illustrative example, if all request fields match and there are no permission violations for that particular TLB entry, the request will be declared to be a hit in the TLB and the corresponding PPN from the matched TLB entry will be provided by the TLB in a response. The response from the TLB may comprise the PA corresponding to the VA supplied to the TLB with the request. The TLB outputs the PPN corresponding to the requested PA in the response.

The memory management system may comprise multiple physical address (PA) output ports. Each PA output port of the multiple PA output ports may be dedicated to an individual thread. The TLB translates the VA received with a request to the corresponding PA for the thread identified by the thread Id provided with the request. The TLB is configured to output the PA comprising a PPN on an output register/port selected depending on the thread Id of the request. The TLB may be configured such that as a result of a TLB miss, the request may be saved, and the request may be passed on to lower levels of a multi-level TLB. For example, the request may be sent to a secondary or tertiary TLB, or to a PTW unit, and the output port dedicated to the individual thread identified by the thread Id associated with the request may be marked with an item status indicating the requested item/translation is not available currently but may be available after some time. The output port status indicating the requested item/translation is not available currently but may be available after some time may be referred to as a transient status. When the requested item/translation becomes available the output port dedicated to the individual thread identified by the thread Id associated with the request may be marked with an item status indicating the requested item/translation is available. The output port status indicating the requested item/translation is available may be referred to as a valid status. The memory management system may be configured to send and process requests and receive and process responses that may comprise packets communicated between various memory management system modules or circuits. In some cases, a packet may be partially received at a point in time. A port waiting for a response that has not been fully received may be marked with invalid status. In some cases, a packet may not be fully received before a predetermined time period expires, and the associated port may be marked with invalid status.

The memory management system may be configured to handle requests and responses from multiple TLB levels and a PTW simultaneously. Each individual output port of the multiple output ports is dedicated to an individual thread. Each individual output port of the multiple output ports is configured with a per-thread transient bit and a per-thread valid bit each dedicated to the individual thread served by the output port. Each thread's output port is governed based on the respective digital value of the transient bit and the valid bit. Each thread's port may be enabled when the port status is valid and not transient. Each thread's transient bit may be operably coupled with logic designed to determine a digital value of the transient bit based on the status of the item requested from the multi-level TLB by the one or more thread. Each thread's valid bit may be operably coupled with logic designed to determine a digital value of the valid bit based on the status of the item requested from the multi-level TLB by the one or more thread.

The memory management system may comprise a thread scheduler configured to adjust the scheduling of the multiple threads. The thread scheduler may be configured to schedule a thread to run or to not run, in response to a signal or command received from the memory management system. The memory management system may be configured to signal or command the thread scheduler to permit a thread to run and access system resources using the thread's dedicated PA output port when the port is marked in valid status. The memory management system may be configured to signal or command the thread scheduler to permit a thread to not run when the port is marked in transient status. The memory management system may be configured to signal or command the thread scheduler to permit multiple threads not waiting for a requested item to run and access system resources using the respective threads' dedicated PA output ports, while permitting threads waiting for a requested item (for example, having a port marked in transient status) to not run. The thread scheduler may be configured to govern the execution scheduling of multiple threads based at least in part on the status of a port or a requested item associated with an individual thread, inline with what has been described above with reference to the per-thread and per-port valid bit and transient bit.

In some implementations, the thread scheduler may be configured to govern the execution scheduling of multiple threads at least in part using thread granularity-based techniques such as those described by U.S. patent application Ser. No. 16/945,936 entitled "Multi-Threaded Processor with Thread Granularity" with reference to FIGS. 1, 1A, 1B, 2A, and 2B therein, filed by Applicant: Redpine Signals, Inc. on Aug. 3, 2020, Inventors: Kallam; Subba Reddy, et al., the entire contents of which are herein incorporated by reference.

The thread scheduler may be configured to govern the execution scheduling of multiple threads at least in part using thread granularity-based techniques and at least in part using the status of a port or a requested item associated with an individual thread, in accordance with what has been described above with reference to the per-thread and per-port valid bit and transient bit. For example, the thread scheduler may be configured to permit individual threads to run or not run depending on the status of a port or a requested item associated with an individual thread, and to further govern the execution scheduling of those threads permitted to run using the thread granularity-based techniques. The thread scheduler may be configured to govern the execution scheduling of threads permitted to run according to a round-robin technique wherein threads are executed in a predetermined priority order based on the ordering of the threads' respective thread Ids in a thread map register. The thread scheduler may be configured to govern the execution scheduling of threads using sequential or non-sequential techniques based on configuring the respective thread Ids in the thread map register.

The thread scheduler may govern the execution scheduling of multiple threads on a multi-thread superscalar processor. The multi-thread superscalar processor may be configured with a series of cascaded stages, each cascaded stage providing the results of an operation to a successive stage, the first of the cascaded stages receiving an instruction from a program memory address referenced by thread identifier and associated program counter. The multi-thread superscalar processor may be configured with multiple per-thread program counters and multiple per-thread register files. Each thread may have an associated thread identifier provided by the thread map register configured to contain a sequence of thread identifiers. Each thread identifier in the thread map register may indicate which program counter and register file is to be used by a particular processor stage. In an illustrative example, a particular instruction selected using the thread identifier and per thread program counter may be provided to a sequence of pipelined stages comprising an instruction fetch stage, an instruction decode stage, a decode/execute stage, an execute stage, a load/store stage, and optionally to a writeback stage. The decode/execute stage may be operably coupled to the register file selected by thread identifier.

The thread map register may be re-programmable by the processor to dynamically identify a sequence of threads to be executed based on the respective threads' thread Ids, thereby associating each thread with a per-thread program counter register, a per-thread register file, and optionally at least one TLB entry based on each individual thread's thread Id. The thread map register maybe configured to identify the particular thread being executed, where the thread map register may refer to any number of different threads, subject to the limit of the number of per-thread program counters and per-thread register files. In an illustrative example, the thread map register may contain 10 entries, and the number of per-thread program counters and per-thread register files may be 4. In this case, the granularity of each of the 4 threads may be specified to 10%, such that thread_0 may receive 1 cycle, thread_1 may receive 4 cycles, thread_2 may receive 3 cycles, and thread_3 may receive 2 cycles. The thread register, without limit, may specify any of [0,1,1,1,1,2,2,2, 3,3], which are canonically executed. The thread register may be updated to change thread numbers or allocation of threads, for example, thread 0 may be expanded and thread 1 reduced, such as by writing the new values [0,0,0,0,1,2, 2,2,3,3] to the thread register. One of ordinary skill will appreciate that the thread scheduler may be configured to permit individual threads to run or not run depending on the status of a port or a requested item associated with an individual thread, and in addition to simultaneously govern the execution scheduling of those threads permitted to run, using the thread granularity-based techniques described with reference to the thread map register.

FIG. 1 is a block diagram of an exemplary multi-threaded memory management system having a memory management unit (MMU) configured with a plurality of physical address (PA) output ports individually dedicated to a respective plurality of threads, wherein the MMU is configured to adjust scheduling of the plurality of threads based on a status of an item requested from a cache. In FIG. 1, the multi-threaded memory management system 100 includes the memory management unit (MMU) 105 operably coupled with the Instruction Translation Look-aside Buffer (I-TLB) 110. In the depicted implementation, the I-TLB 110 is a Micro-TLB 110. The I-TLB 110 receives requests to the MMU 105 to translate virtual addresses (VAs) from multiple threads to physical addresses (PAs), using the I-TLB Lower Levels 115 and the Instruction Cache 120. In the depicted example, the I-TLB Lower Levels 115 include a Page Table Walk (PTW) Unit. In the depicted implementation, the Micro-TLB 110 receives VAs from the multiple threads 125-1, 125-2, 125-3, ..., 125-n. The VAs received by the Micro-TLB 110 are determined by the Per-thread Program Counter (PC-n) 130-1, 130-2, 130-3, ..., 130-n respective to each of the multiple threads 125-1, 125-2, 125-3, ..., 125-n. In the depicted implementation, the Micro-TLB 110, the I-TLB Lower Levels 115, and the Instruction Cache 120 are configured to retrievably store the respective TLB entry 135-1, 135-2, 135-3, ..., 135-n comprising the respective (thread Id-n) TID-n 140-1, 140-2, 140-3, ..., 140-n identifying the threads 125-1, 125-2, 125-3, ..., 125-n associated with the respective TLB entry 135-1, 135-2, 135-3, ..., 135-n. In an illustrative example, the MMU 105 may be configured to use the thread-Id-n 140-1, 140-2, 140-3, ..., 140-n in the respective TLB entry 135-1, 135-2, 135-3, ..., 135-n to identify and respond with the VA-PA pair corresponding to a request to translate a VA to a PA for a given thread. The particular thread may be specified in the request by the respective TID-n 140-1, 140-2, 140-3, ..., 140-n. In the depicted implementation the MMU 105 is configured with multiple outputs, port-n 145-1, 145-2, 145-3, ..., 145-n respectively dedicated to the individual threads 125-1, 125-2, 125-3, ..., 125-n. The MMU 105 outputs the physical address (PA) 150 using the output port-n 145-1, 145-2, 145-3, ..., 145-n dedicated to the respective individual requesting thread 125-1, 125-2, 125-3, ..., 125-n. The Micro-TLB 110 supplies the response PA in the event of an I-TLB hit 155. In the event of an I-TLB miss 160 the Micro-TLB 110 forwards the request to the I-TLB Lower Levels 115. The I-TLB Lower Levels 115 supply the I-TLB miss response 165 when the requested item is found in the I-TLB Lower Levels 115, which in the depicted implementation includes the PTW Unit.

Figure 2:
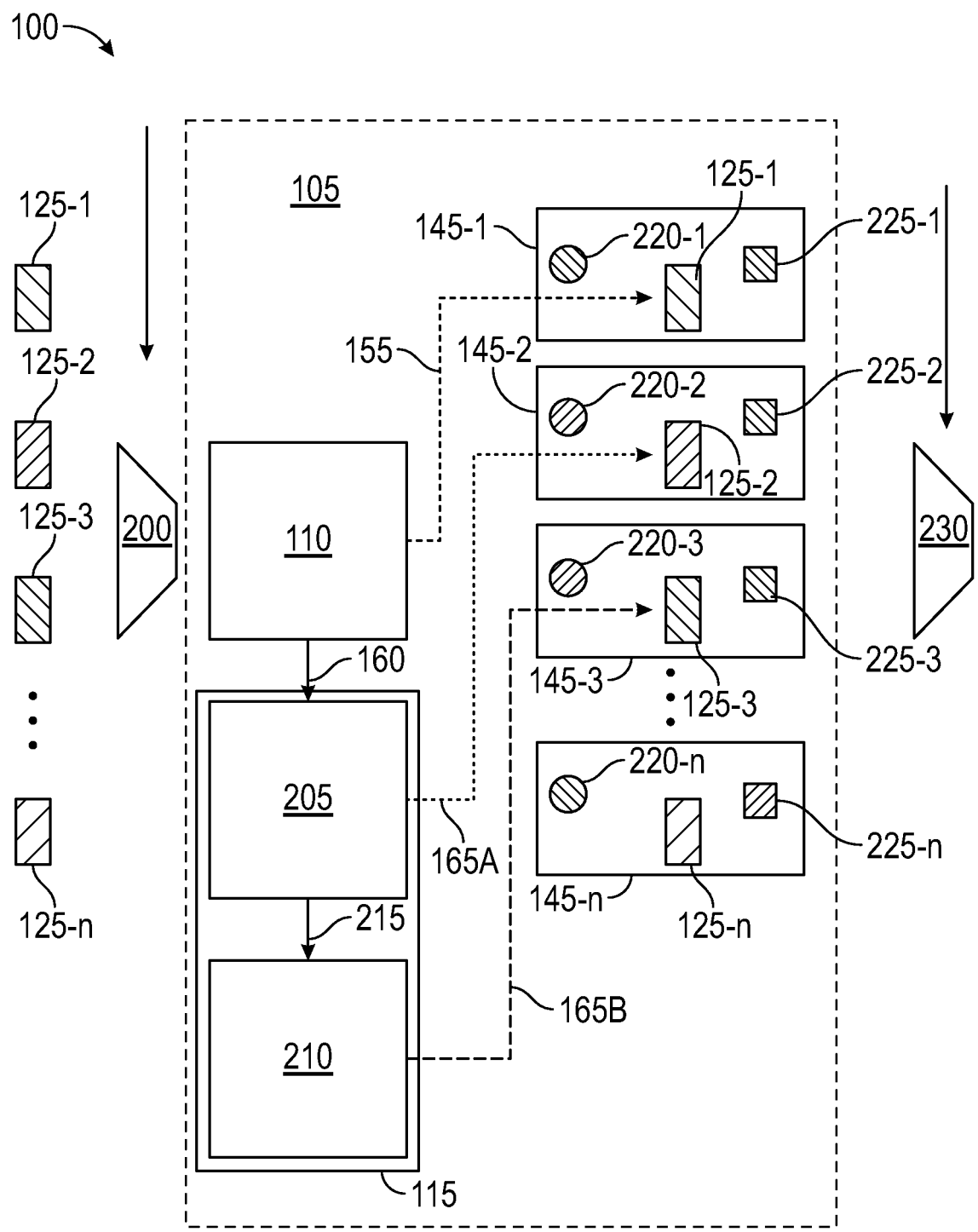
FIG. 2 is a block diagram of an exemplary multi-threaded memory management system implementation illustrating per-thread dedicated PA output ports configured with per-thread transient and valid bits.

FIG. 2 is a block diagram of an exemplary multi-threaded memory management system implementation illustrating per-thread dedicated PA output ports configured with per-thread transient and valid bits. In FIG. 2, the multi-threaded memory management system 100 includes the thread scheduler 200 configured to govern the execution scheduling of the individual threads 125-1, 125-2, 125-3, ..., 125-n. In the depicted implementation, the I-TLB Lower Levels 115 includes the Main-TLB 205 and the Page Table Walk Unit (PTW) 210. In the case of an I-TLB miss 160 the Micro-TLB 110 forwards the request to the Main-TLB 205. In the depicted implementation, the I-TLB miss response 165 (depicted at least in FIG. 1) from the I-TLB Lower Levels 115 includes the Micro-TLB miss response 165A from the Main-TLB 205 and the Main-TLB miss response 165B from the PTW 210. In the case of a Main-TLB Miss 215 the Main-TLB 205 forwards the request to the PTW 210. In the depicted implementation the multiple outputs port-n 145-1, 145-2, 145-3, ..., 145-n are configured with respective per thread transient bit-n 220-1, 220-2, 220-3, ..., 220-n and per thread valid bit-n 225-1, 225-2, 225-3, ..., 225-n. The per thread transient bit-n 220-1, 220-2, 220-3, ..., 220-n is set in the case of a TLB miss while there is no response to provide. The expected response may be either a Physical Page Number (PPN) or a page fault. The respective per thread output port-n 145-1, 145-2, 145-3, ..., 145-n is held in transient state by setting the respective per thread transient bit-n 220-1, 220-2, 220-3, ..., 220-n indicating that the port will be filled when the response arrives from a lower level. During this duration, busy is asserted for the respective thread 125-1, 125-2, 125-3, ..., 125-n. In the depicted example, output port 145-1 receives the I-TLB hit 155 response supplied by the Micro-TLB 110. In the depicted example, output port 145-2 receives the Micro-TLB miss response 165A from the Main-TLB 205. In the depicted example, output port 145-3 receives the Main-TLB miss response 165B from the PTW 210. In the depicted implementation, the transient bits 220-2 and 220-3 of respective output ports 145-2 and 145-3 are set in transient state while the responses are filled from the lower levels. When any thread's output is held in transient state, the other threads are permitted by the thread scheduler 200 to continue their execution and TLB lookup and provide the corresponding physical address to their respective output registers. This enables non-blocking access to the TLB's for lookups and removes any cross-thread dependency/resource blocking. When the response for that particular missed request arrives, the transient bit is unset, and normal pipelined handshake operation continues. The physical address is then put on the appropriate output register depending upon the TID of the request using output arbitration logic/mux 230.

In the exemplary scenario depicted by FIG. 2, multiple threads are missed in the Micro-TLB 110 and their respective requests are at different levels of the TLB hierarchy. In such a case, multiple responses may occur, and multiple output registers may be set simultaneously. In the depicted example scenario, thread 125-3 was missed in the Main-TLB 205 and a response is coming from the PTW 210 unit. In the depicted example scenario, thread 125-2 was missed in the Micro-TLB 110 but is a hit in the main TLB 205. In the depicted example scenario, thread 125-1 is a hit in the Micro-TLB 110. This leads to scenario where the MMU 105 captures three responses simultaneously without stalls in a single clock cycle, using multiple per thread output ports/registers thereby removing cross thread-dependency and allowing fair non-blocking access of TLB's to each thread. By contrast, a design using a single output port would have encountered a stall on any two responses, and such a single output port design would have been able to use only one response as an output at any given time.

Figure 3:
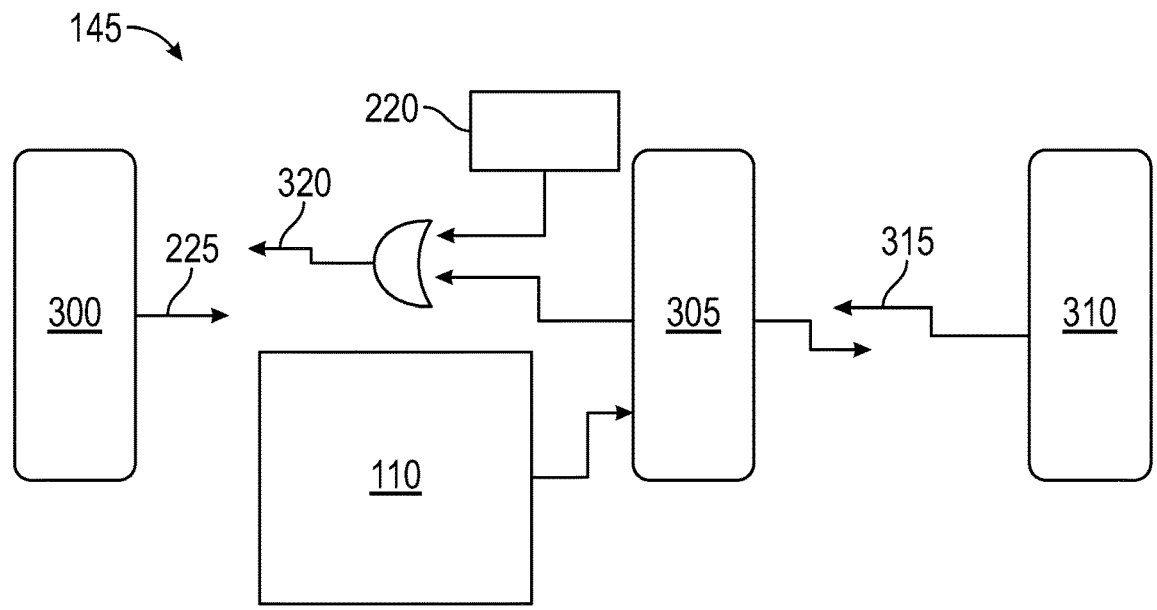
FIG. 3 depicts an exemplary logic circuit designed to control pipeline execution using the transient and valid bits for one thread based on the status of an item requested from the multi-level TLB.

FIG. 3 depicts an exemplary logic circuit designed to control pipeline execution using the transient and valid bits for one thread based on the status of an item requested from the multi-level TLB. In FIG. 3, the depicted handshake mechanism determines pipeline control signals using the transient bit 220 and the valid bit 225 for an output port 145 dedicated to an individual thread. In the depicted example, the handshake mechanism determines the control signals for a pipelined processor having three fetch stages: fetch-0 300, fetch-1 305, and fetch-2 310. In the depicted implementation, the valid bit 225 is set and the transient bit is unset when the response is available to the fetch-0 300 stage. The transient bit 220 is set in response to the associated miss. The fetch-2 MMU ready 315 and the MMU fetch-0 ready 320 signals permit pipeline operation to continue for that individual thread when the response for that particular missed request arrives.

Figure 4:
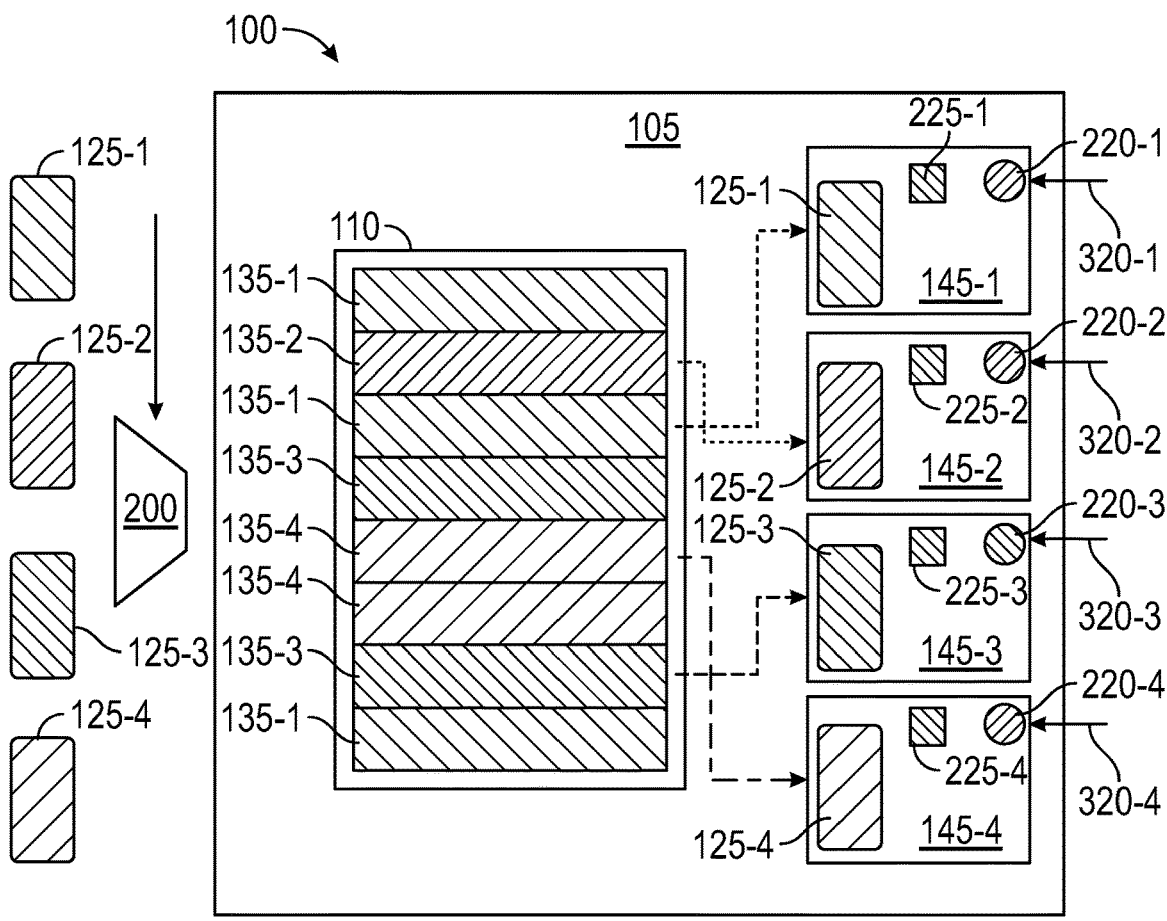
FIG. 4 is a block diagram illustrating the operation of an exemplary multi-threaded memory management system implementation configured to manage simultaneous TLB requests and responses for four threads.

FIG. 4 is a block diagram illustrating the operation of an exemplary multi-threaded memory management system implementation configured to manage simultaneous TLB requests and responses for four threads. In the example scenario depicted by FIG. 4, threads 125-1, 125-2, 125-3, and 125-4 are associated with their respective TLB entries 135-1, 135-2, 135-3, and 135-4 in the Micro-TLB 110. In the depicted example, the response from a hit in the Micro-TLB 110 for thread 125-1 is delivered to the output port 145-1, the valid bit 225-1 is set and the transient bit 220-1 is unset. In the depicted example, the response from a hit in the Micro-TLB 110 for thread 125-2 is delivered to the output port 145-2, the valid bit 225-2 is set and the transient bit 220-2 is unset. In the depicted example, the response from a hit in the Micro-TLB 110 for thread 125-3 is delivered to the output port 145-3, the valid bit 225-3 is set and the transient bit 220-3 is unset. In the depicted example, the response from a hit in the Micro-TLB 110 for thread 125-4 is delivered to the output port 145-4, the valid bit 225-4 is set and the transient bit 220-4 is unset. The depicted example illustrates how a request associated with a thread may be used for proper selection of the appropriate output port/register for each thread, so a delayed translation (due to a miss) in one thread does not stall the other threads. The other threads continue to perform TLB lookup and provide physical addresses to respective output registers.

Figure 5:
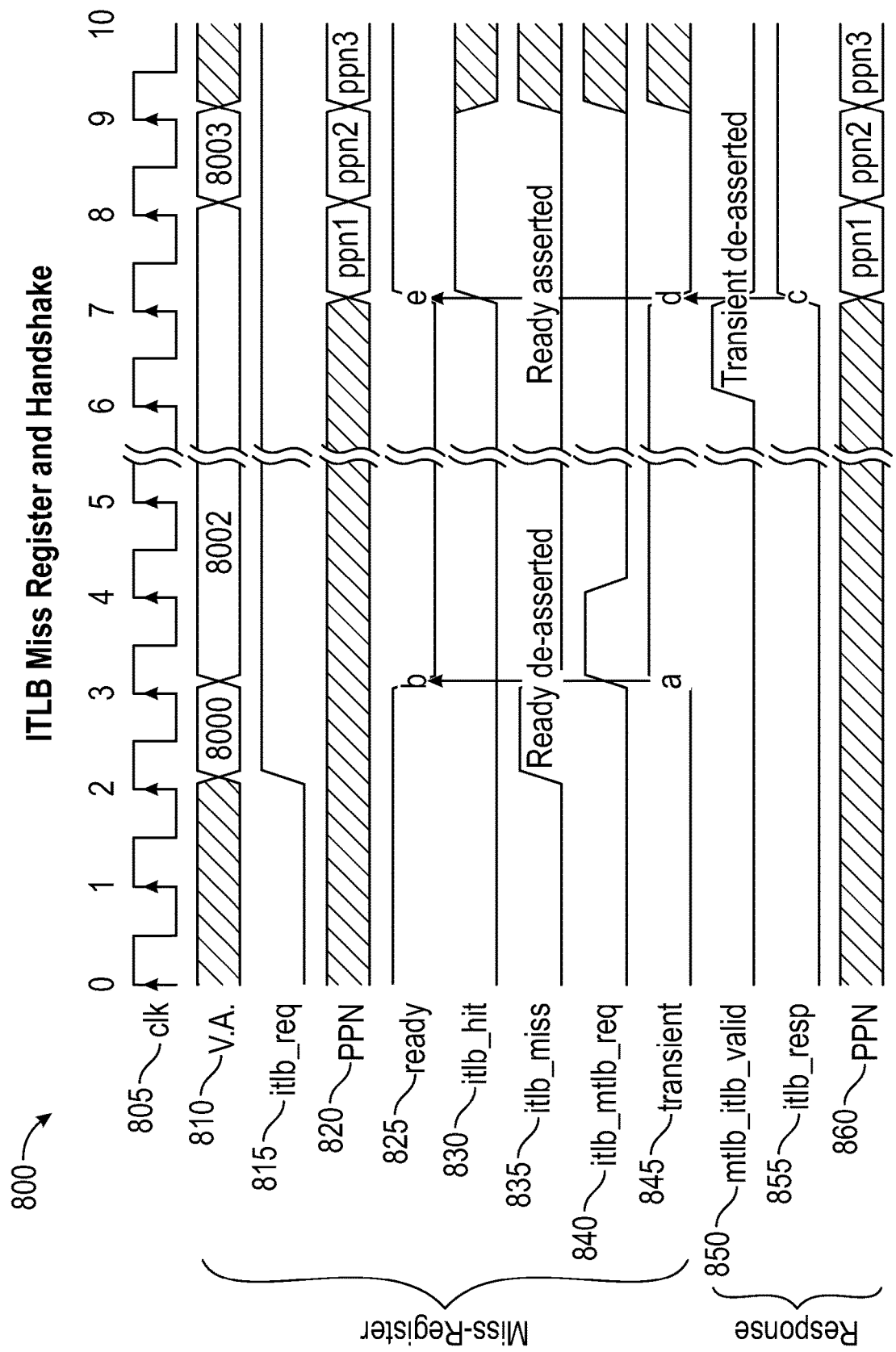
FIG. 5 is a timing diagram depicting exemplary pipeline handshake timing.

FIG. 5 is a timing diagram depicting exemplary pipeline handshake timing. In FIG. 5, the exemplary pipeline handshake timing 800 includes the clock 805 reference for the relative timing of the Virtual Address (VA) 810, the Miss-Register ITLB request 815, the Miss-Register Physical Page Number (PPN) 820, the Miss-Register MMU ready 825, the Miss-Register ITLB hit 830, the Miss-Register ITLB miss 835, the Miss-Register ITLB MTLB request 840, the Miss-Register transient bit 845, the Response MTLB ITLB valid 850, the Response ITLB response 855, and the Response Physical Page Number (PPN) 860. In the depicted example, the VA 810 is presented after a leading edge of the clock 805. One clock 805 cycle after a miss 835, ready 825 is de-asserted and transient bit 845 is set. valid 850 is asserted one clock 805 cycle before response 855 is asserted and transient bit 845 is unset, indicating the PPN 860 is available, permitting pipeline operation to continue for that individual thread as the response for that particular missed request has arrived.

Although various features have been described with reference to the Drawings, other features are possible. For example, in an illustrative example of a technical solution to a technical problem, having a separate output port for each thread eliminates the competition each thread has to make for an available output port and creates a independent non-blocking access for TLB lookups. Since the translation can take thousands of clock cycles for the translation, the other independent threads can move forward as there is no inter-thread dependency. This is the major advantage of non-blocking TLB architecture that even on a long lookup for one thread, other threads can continue their program execution irrespective of the outputs of other threads. On keeping output registers per-thread, this situation can be easily handled in accordance with the teaching of the present disclosure. Furthermore, even in cases when there is no miss in any thread, it can happen that the pipeline itself is stalled for that thread and cannot accept the response of the MMU. In such a situation, the output register will hold the valid output till the time pipeline accepts the MMU response. Since a valid output has to be held, other threads cannot access this output register leading to indirect stall for all the threads. By keeping per-thread output registers, each thread will find an empty register to store the valid response, thus streaming other threads despite the pipeline being stalled for one thread.

By contrast with the teaching of the present disclosure, in an illustrative example of prior art design and usage without a separate dedicated output port for each individual thread, TLB's are Translation Look-aside Buffers which keep Virtual Address to Physical Address translation as a key value pair. A TLB provides an appropriate Physical address or raises a fault for the requested virtual address. Without the TLB's, for every request virtual address, the translation would be done by accessing the main memory which takes thousands of clock cycles. With the help of a TLB, frequently requested virtual addresses may be translated to physical addresses as quick as one clock cycle. The hit rate of a TLB may be greater than 90%, which helps the pipeline stream, in turn saving many clock cycles. TLB's may have some permission bits which have to be checked according to the request type and current processor state. A TLB entry may include a Thread ID (TID), and a Tag that is compared with the request attributes. If the permission checks pass and the tag matches, a Physical Page Number (PPN) is given as the output.

By contrast with the teaching of the present disclosure, in an illustrative example of prior art design and usage without a separate dedicated output port for each individual thread, on a TLB miss in a pipeline the thread is stalled as there is no physical address to fetch instructions from. When the request goes to subsequent levels in the MMU, there is no physical address present to give to the next stages. As a result, no new PC is fetched for that thread. The pipeline is stalled for that particular thread. After registering a miss, a page table walk occurs and the physical address is provided to an output of the TLB to the next stage and the thread makes forward progress. Generally, a TLB lookup blocks all subsequent requests on a miss, which is a degrading situation when a TLB structure is shared between multiple independent threads. On a miss, the output port/register is blocked by the missed thread and other threads cannot perform TLB lookups. In such a prior art design, there is competition among threads for the output registers/port (resource), and thread starvation may result from this competition.

By contrast with the teaching of the present disclosure, in an illustrative example of prior art design and usage without a separate dedicated output port for each individual thread, even if a miss handler-like structure was implemented (requiring the same amount of register resources) such a design would not completely eliminate the competition among threads for the single output register.

By contrast with the teaching of the present disclosure, in an illustrative example of prior art design and usage without a separate dedicated output port for each individual thread, consider a scenario where multiple responses for multiple threads are occurring simultaneously: one response from a PTW, one response from a Main-TLB, and one response from a TLB Hit. In such a scenario using prior art designs with a single output port/register, there would be a need of keeping a priority logic in cases when output from multiple places occurred simultaneously. This would also stall the other threads depending on response of further stages of a pipeline.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale and features of one implementation may be employed with other implementations as the skilled artisan would recognize, even if not explicitly stated herein. Descriptions of well-known components and processing techniques may be omitted so as to not unnecessarily obscure the implementation features.

Elements described herein as coupled or connected may have an effectual relationship realizable by a direct connection or indirectly with one or more other intervening elements.

In the present disclosure, the term "any" may be understood as designating any number of the respective elements, that is, as designating one, at least one, at least two, each or all of the respective elements. Similarly, the term "any" may be understood as designating any collection(s) of the respective elements, that is, as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. Use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of" or "consisting of." In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

Throughout this disclosure and elsewhere, block diagrams or flowchart illustrations may depict methods, apparatuses (i.e., systems), and computer program products. Each element of the block diagrams or flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer or network systems over numerous topologies. Within this field, the configuration and management of large systems includes storage devices and computers that are communicatively coupled to dissimilar computers and storage devices over a network, such as the Internet.

The respective reference numbers and descriptions of the elements depicted by the Drawings are summarized as follows.

100 multi-threaded memory management system
105 memory management unit (MMU)
110 Instruction Translation Look-aside Buffer (I-TLB)/Micro-TLB
115 I-TLB Lower Levels/Main-TLB and Page Table Walk (PTW) Unit
120 Instruction Cache
125 thread
125-1, 125-2, 125-3, . . . , 125-n thread-n
130-1, 130-2, 130-3, . . . , 130-n Per-thread Program Counter (PC-n)
135 TLB entry
135-1, 135-2, 135-3, . . . , 135-n TLB entry
140 thread Id (TID)
140-1, 140-2, 140-3, . . . , 140-n (thread Id-n) TID-n
145 output register/port
145-1, 145-2, 145-3, . . . , 145-n output register-n/port-n
150 physical address (PA)
155 I-TLB hit
160 I-TLB miss
165 I-TLB miss response
165A Micro-TLB miss response
165B Main-TLB miss response
200 thread scheduler
205 Main-TLB
210 Page Table Walk Unit (PTW)
215 Main-TLB Miss
220 transient bit
220-1, 220-2, 220-3, . . . , 220-n per thread transient bit-n
225 valid bit
225-1, 225-2, 225-3, . . . , 225-n per thread valid bit-n
230 output arbitration logic/mux
300 fetch-0
305 fetch-1
310 fetch-2
315 fetch-2 MMU ready
320 MMU fetch-0 ready
800 Pipeline ITLB Miss Register Handshake Waveform with Transient Bit
clock 805
Virtual Address (VA) 810

-continued

Miss-Register ITLB request 815
Miss-Register Physical Page Number (PPN) 820
Miss-Register MMU ready 825
Miss-Register ITLB hit 830
Miss-Register ITLB miss 835
Miss-Register ITLB MTLB request 840
Miss-Register transient bit 845
Response MTLB_ITLB valid 850
Response ITLB response 855
Response Physical Page Number (PPN) 860

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:
a memory management unit (MMU) configured with a plurality of physical address (PA) output ports individually dedicated to a respective plurality of threads;
each respective thread of the plurality of threads executing processor executable instructions fetched from a virtual address (VA) determined by a per-thread program counter (PC) dedicated to the respective thread;
wherein the MMU is configured to adjust scheduling of the plurality of threads based on a status of an item requested from a cache;
the MMU configured to adjust scheduling of the plurality of threads at least in part by signaling the thread scheduler to run or not run one or more threads of the plurality of threads based on a status of an item requested by the one or more thread from a multi-level translation look-aside buffer (TLB);
the status of the item being one of transient status, valid status, or invalid status.

2. The apparatus of claim 1, wherein the apparatus further comprises the MMU is configured to translate the virtual address (VA) input from an individual thread to the PA output on the respective PA output port.

3. The apparatus of claim 1, wherein the cache further comprises a translation look-aside buffer (TLB).

4. The apparatus of claim 1, wherein the item requested further comprises an instruction.

5. The apparatus of claim 1, wherein the item requested further comprises data.

6. The apparatus of claim 1, wherein the status of the item requested from the cache further comprises expecting a response comprising the item requested from the cache.

7. The apparatus of claim 1, wherein the status of the item requested from the cache further comprises receiving a response comprising the item requested from the cache.

8. The apparatus of claim 1, wherein adjust scheduling further comprises signal a thread scheduler.

9. The apparatus of claim 8, wherein adjust scheduling of the plurality of threads based on the status of the item requested from the cache further comprises: in response to determining at least one thread will stall waiting for an expected response comprising the item requested from the cache, signal the thread scheduler to permit the at least one thread to not run; and in response to receiving the response comprising the item requested from the cache for the at least one thread, signal the thread scheduler to permit the at least one thread to run.

10. An apparatus comprising:
a memory management unit (MMU) configured with a plurality of physical address (PA) output ports, wherein each PA output port of the plurality of PA output ports is individually dedicated to one respective thread of a plurality of threads, and wherein each respective thread of the plurality of threads executes processor executable instructions fetched from a virtual address (VA) determined by a per-thread Program Counter (PC) dedicated to the respective thread;
a thread scheduler operably coupled with the MMU, wherein the thread scheduler is configured to govern execution scheduling of the plurality of threads based at least in part on round-robin scheduling, wherein the MMU is configured to adjust scheduling of the plurality of threads at least in part by signaling the thread scheduler to run or not run one or more thread of the plurality of threads based on a status of an item requested by the one or more thread from a multi-level translation look-aside buffer (TLB), and wherein the status of the item requested from the multi-level TLB by the one or more thread is one of transient status, valid status, or invalid status; and
a multiplexer configured to govern the plurality of PA output ports, wherein the PA output port dedicated to each thread not having an invalid or transient status for the requested item is enabled.

11. The apparatus of claim 10, wherein the apparatus further comprises the multi-level TLB is operably coupled with a page table walk (PTW) unit configured to locate the item requested in response to receiving request for the item as a result of a miss in at least one level of the multi-level TLB, and wherein the multi-level TLB is operably coupled with the plurality of PA output ports to provide at least one response comprising the requested item.

12. The apparatus of claim 10, wherein the MMU further comprises the multi-level TLB configured to retrievably store a plurality of TLB entries wherein each TLB entry of the plurality of TLB entries comprises a Virtual Address, Physical Address (VA-PA) pair, wherein the plurality of VA-PA pairs are indexed per thread in the multi-level TLB by a unique thread Id.

13. The apparatus of claim 12, wherein the apparatus further comprises the MMU is configured to use the thread Id associated with one or more thread to locate the TLB entry storing a VA-PA pair associated with the item requested by the one or more thread from the multi-level TLB.

14. The apparatus of claim 10, wherein the apparatus further comprises each PA output port of the plurality of PA output ports is configured with a transient bit operably coupled with logic designed to determine a digital value of the transient bit based on the status of the item requested from the multi-level TLB by the one or more thread.

15. The apparatus of claim 10, wherein the apparatus further comprises each PA output port of the plurality of PA output ports is configured with a valid bit operably coupled with logic designed to determine a digital value of the valid bit based on the status of the item requested from the multi-level TLB by the one or more thread.

16. The apparatus of claim 10, wherein the apparatus further comprises logic configured to signal the thread scheduler to permit the at least one thread to run or not run based on a digital value of a transient bit or a valid bit configured in the PA output port dedicated to the at least one thread.

17. An apparatus comprising:
a memory management unit (MMU) configured with a plurality of physical address (PA) output ports, wherein each PA output port of the plurality of PA output ports is individually dedicated to one respective thread of a plurality of threads, and wherein each respective thread of the plurality of threads executes processor executable instructions fetched from a virtual address (VA) determined by a per-thread Program Counter (PC) dedicated to the respective thread;
a thread scheduler operably coupled with the MMU, wherein the thread scheduler is configured to govern execution scheduling of the plurality of threads based at least in part on round-robin scheduling, wherein the MMU is configured to adjust scheduling of the plurality of threads at least in part by signaling the thread scheduler to run or not run one or more thread of the plurality of threads based on a status of an item requested by the one or more thread from a multi-level translation look-aside buffer (TLB), wherein the status of the item requested from the multi-level TLB by the one or more thread is one of transient status, valid status, or invalid status, wherein the multi-level TLB is operably coupled with a page table walk (PTW) unit configured to locate the item requested in response to receiving a request for the item as a result of a miss in at least one level of the multi-level TLB, and wherein the multi-level TLB and the PTW unit are operably coupled with the plurality of PA output ports to provide a plurality of responses simultaneous within a predetermined time period, wherein the plurality of responses comprise a respective plurality of requested items, wherein each requested item was requested by an individual thread of the plurality of threads, and wherein each response of the plurality of responses is output to the PA output port dedicated to the individual thread; and
a multiplexer adapted with a number of inputs corresponding to the number of the plurality of threads, wherein the multiplexer is configured to govern the plurality of PA output ports, and wherein the PA output port dedicated to each thread not having an invalid or transient status for any requested item is enabled.

18. The apparatus of claim 17, wherein the apparatus further comprises a pipelined processor operably coupled with the MMU.

19. The apparatus of claim 18, wherein the pipelined processor further comprises a superscalar processor.

20. The apparatus of claim 18, wherein the pipelined processor further comprises a plurality of fetch stages, and wherein the status of the item requested from the multi-level TLB by the one or more thread is determined as a function of an item status output from at least two fetch stages of the plurality of fetch stages.

* * * * *